(12) United States Patent
Shin et al.

(10) Patent No.: US 12,742,986 B2
(45) Date of Patent: Sep. 22, 2026

(54) DISPLAY DEVICE INCLUDING WIRE GRID POLARIZATION LAYER

(71) Applicant: Samsung Display Co., LTD., Yongin-si (KR)

(72) Inventors: Dong Chul Shin, Yongin-si (KR); Min Hee Son, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/735,801

(22) Filed: Jun. 6, 2024

(65) Prior Publication Data

US 2025/0060627 A1 Feb. 20, 2025

(30) Foreign Application Priority Data

Aug. 16, 2023 (KR) ........................ 10-2023-0106639

(51) Int. Cl.
*G02F 1/1335* (2006.01)
*G02F 1/13363* (2006.01)

(52) U.S. Cl.
CPC .. *G02F 1/133548* (2021.01); *G02F 1/133514* (2013.01); *G02F 1/133526* (2013.01); *G02F 1/13363* (2013.01)

(58) Field of Classification Search
None
See application file for complete search history.

(56) References Cited

U.S. PATENT DOCUMENTS 7,058,252 B2 6/2006 Woodgate et al.
7,965,357 B2 6/2011 Van De Witte et al.
9,001,290 B2 4/2015 Lee et al.
10,551,676 B2 2/2020 Cho et al.
2007/0296896 A1* 12/2007 Hong ................ G02F 1/133526 349/122
2018/0157086 A1* 6/2018 Cho ..................... G02F 1/13362
2019/0094435 A1* 3/2019 Shen ................. G02F 1/133528
2022/0107452 A1* 4/2022 Lee ................... G02F 1/133536
2022/0302419 A1* 9/2022 Yang .................... H10K 59/879
2023/0215997 A1* 7/2023 Park ................... H10H 20/8312 257/79

FOREIGN PATENT DOCUMENTS

CN 115347015 11/2022
CN 114326206 6/2023
KR 10-2018-0063960 6/2018
KR 10-2016054 9/2019

OTHER PUBLICATIONS

International Search Report corresponding to International Application No. PCT/KR2024/010337 dated Oct. 31, 2024.

* cited by examiner

*Primary Examiner* — Phu Vu
(74) *Attorney, Agent, or Firm* — CANTOR COLBURN LLP

(57) ABSTRACT

Provided is a display device including a wire grid polarization layer. The display device includes: a display layer; a quantum-dot layer disposed on the display layer and including a color conversion layer including a quantum-dot and a scatterer; and an upper layer disposed on the quantum-dot layer and including a phase retardation layer and a wire grid polarization layer disposed on the phase retardation layer.

20 Claims, 11 Drawing Sheets

FIG. 3

DD(DL, SPX)
EL
TFE
CPL
ELT2
PDL
ELT1
LEL
PCL(BSL)
PXC
DR3
LD: EL, ELT1, ELT2

DD
NSPXA
SPX1
(SPXA1)
SPX2
(SPXA2)
SPX3
(SPXA3)
USUB(GBS)
WGP(WL)
QWP
CF3
CF1
CF2
LR
CP2
BNK
CP1
TFE
CPL
ELT2
PDL
BSL
SC
SCT
QD1
QD2
CCL1
CCL2
PXC(TR)
EL1
EL2
EL3
ELT1-1
ELT1-2
ELT1-3
UPL
QL
LEL
PCL
DL
DR3
EL: EL1, EL2, EL3
CF: CF1, CF2, CF3
CCL: CCL1, CCL2
QD: QD1, QD2
SPX: SPX1, SPX2, SPX3
SPXA: SPXA1, SPXA2, SPXA3
ELT1: ELT1-1, ELT1-2, ELT1-3

FIG. 5

USUB(GBS)
L1
L2
L3
WGP(WL)
DR3
WL: L1, L2, L3

2D MODE

3D MODE

<2D MODE>
DD
LC
SPX
SPX
SPX
OL
PL
LS
200
LL
VTL
LCL
UPL
DL/QL
DR3

<3D MODE>
DD
LC
SPX
SPX
SPX
PL
OL
200
LS
LL
VTL
LCL
UPL
DL/QL
DR3

DISPLAY DEVICE INCLUDING WIRE GRID POLARIZATION LAYER

CROSS-REFERENCE TO RELATED APPLICATION(S)

This application claims priority to and benefits of Korean patent application No. 10-2023-0106639 under 35 U.S.C. § 119, filed on Aug. 16, 2023, in the Korean Intellectual Property Office, the entire contents of which are incorporated herein by reference.

BACKGROUND

1. Technical Field

Embodiments relate to a display device including a wire grid polarization layer.

2. Description of the Related Art

With the development of information technology, the importance of a display device, which functions as a connection medium between a user and information, has been emphasized.

Display devices require a structure to improve external visibility. For example, there is a need to adjust external light reflectance to improve external visibility.

A display device may include a panel capable of emitting light. The emitted light may be emitted to the outside through one or more layers. Therefore, there is also a need to improve light output efficiency of a display device.

SUMMARY

Embodiments provide a display device including a wire grid polarization layer in which external light reflectance is controlled and visibility is improved.

Embodiments provide a display device including a wire grid polarization layer capable of improving light output efficiency.

Embodiments provide a display device including a wire grid polarization layer capable of implementing a light field display.

However, embodiments of the disclosure are not limited to those set forth herein. The above and other embodiments will become more apparent to one of ordinary skill in the art to which the disclosure pertains by referencing the detailed description of the disclosure given below.

In accordance with an embodiment, a display device may include: a display layer; a quantum-dot layer disposed on the display layer and including a color conversion layer including a quantum-dot and a scatterer; and an upper layer disposed on the quantum-dot layer and including a phase retardation layer and a wire grid polarization layer disposed on the phase retardation layer.

In accordance with an embodiment, the upper layer may further include an upper substrate disposed on the wire grid polarization layer. The wire grid polarization layer may include wire grid pattern layers disposed below the upper substrate. The wire grid pattern layers may each include: a first layer disposed on the upper substrate; a second layer disposed on the first layer; and a third layer disposed on the second layer. The first layer and the second layer may include different metal materials from each other.

In accordance with an embodiment, the first layer may absorb at least a portion of light incident to the first layer. The second layer may reflect at least a portion of light incident to the second layer.

In accordance with an embodiment, the first layer may include molybdenum tantalum oxide ($MoTaO_x$). The second layer may include aluminum (Al).

In accordance with an embodiment, a thickness of the first layer may be in a range of about 350 nm to about 550 nm.

In accordance with an embodiment, the first layer may be in contact with the upper substrate.

In accordance with an embodiment, the upper substrate may include a glass material.

In accordance with an embodiment, the phase retardation layer may include a $\lambda/4$ phase retardation film.

In accordance with an embodiment, the phase retardation layer and the wire grid polarization layer may be directly adjacent to each other.

In accordance with an embodiment, the upper layer may further include an optical layer disposed on the quantum-dot layer and a color filter layer disposed on the optical layer. The optical layer and the color filter layer may be directly adjacent to each other to form an interface.

In accordance with an embodiment, a refractive index of the optical layer may be greater than a refractive index of the color filter layer and smaller than a refractive index of the color conversion layer.

In accordance with an embodiment, the display device may further include a first sub-pixel forming a first sub-pixel area where light of a first color is provided, a second sub-pixel forming a second sub-pixel area where light of a second color is provided, and a third sub-pixel forming a third sub-pixel area where light of a third color is provided. The color conversion layer may include a first color conversion layer disposed in the first sub-pixel area and a second color conversion layer disposed in the second sub-pixel area. The quantum-dot layer may further include a scattering layer disposed in the third sub-pixel area.

In accordance with an embodiment, the first color conversion layer, the second color conversion layer, and the scattering layer may each include a scatterer.

In accordance with an embodiment, the display device may further include a light controlling layer disposed on the upper layer. The light controlling layer may include: a variable light transmission layer including liquid crystal molecules; and a lens layer disposed on the variable light transmission layer and including lenses and a peripheral layer disposed on the lenses.

In accordance with an embodiment, light provided by the display layer may be provided as linearly polarized output light and inputted to the light controlling layer. The lenses and the peripheral layer may form an interface. The display device may operate in a two-dimensional (2D) image mode for displaying a 2D image or a three-dimensional (3D) image mode for displaying a 3D image. In case that the display device operates in the 2D image mode, the linearly polarized output light may be transmitted without refraction at the interface. In case that the display device operates in the 3D image mode, the linearly polarized output light may be refracted at the interface.

In accordance with an embodiment, the display device may include: a display layer including a lower substrate, a pixel-circuit layer including a pixel circuit disposed on the lower substrate, and a light emitting element electrically connected to the pixel circuit; a quantum-dot layer disposed on the display layer and including a color conversion layer and a scattering layer; and an upper layer disposed on the quantum-dot layer and including an optical layer, a color filter layer on the optical layer, a phase retardation layer on the color filter layer, a wire grid polarization layer on the phase retardation layer, and an upper substrate directly on the wire grid polarization layer.

In accordance with an embodiment, the phase retardation layer may include a λ/4 phase retardation film.

In accordance with an embodiment, the display device may include: a display layer that emits light; a wire grid polarization layer disposed on the display layer and including wire grid pattern layers; and an upper substrate disposed on the wire grid polarization layer and forming a grid base on which the wire grid pattern layers are disposed. The wire grid pattern layers may each include a first layer directly on the grid base, a second layer on the first layer, and a third layer on the second layer. The first layer and the second layer may include different metal materials from each other. The first layer may absorb at least a portion of light incident to the first layer. The second layer may reflect at least a portion of light incident to the second layer.

In accordance with an embodiment, the first layer may include molybdenum tantalum oxide (MoTaOx), and the second layer may include aluminum (Al).

In accordance with an embodiment, a thickness of the first layer may be in a range of about 350 nm to about 550 nm.

BRIEF DESCRIPTION OF THE DRAWINGS

FIG. 3 is a schematic cross-sectional view illustrating a display layer in accordance with an embodiment.

FIG. 5 is a schematic cross-sectional view illustrating a wire grid polarization layer in accordance with an embodiment.

FIG. 9 is a schematic block diagram illustrating an operation mode of a display device in accordance with an embodiment.

DETAILED DESCRIPTION OF THE EMBODIMENTS

Figure 1:
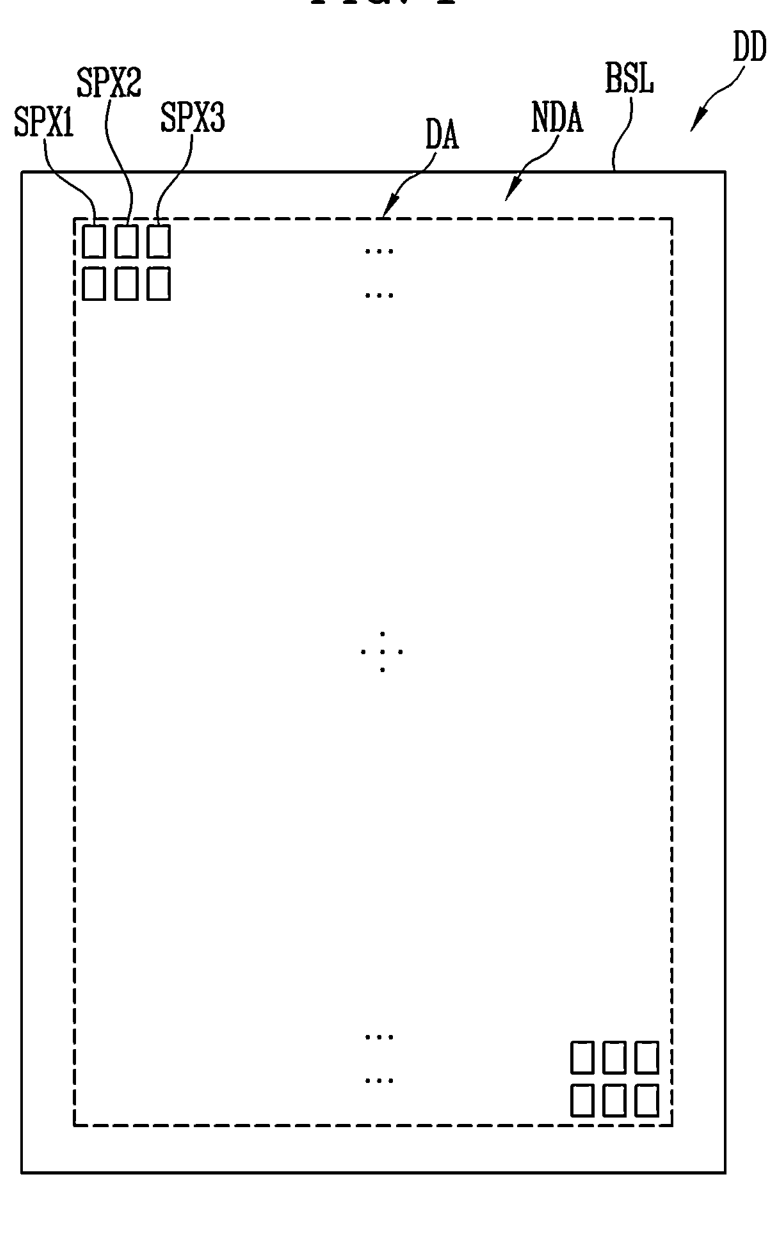
FIG. 1 is a schematic plan view illustrating a display device in accordance with an embodiment.

In the following description, for the purposes of explanation, numerous specific details are set forth in order to provide a thorough understanding of various embodiments or implementations of the invention. As used herein, "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the axis of the first direction DR1, the axis of the second direction DR2, and the axis of the third direction DR3 are not limited to three axes of a rectangular coordinate system, such as the X, Y, and Z-axes, and may be interpreted in a broader sense. For example, the axis of the first direction DR1, the axis of the second direction DR2, and the axis of the third direction DR3 may be perpendicular to one another, or may represent different directions that are not perpendicular to one another. For the purposes of this disclosure, "at least one of A and B" may be understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side"

(e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

The disclosure relates to a display device including a wire grid polarization layer. Hereinafter, a display device including a wire grid polarization layer in accordance with an embodiment will be described with reference to the attached drawings.

FIG. 1 is a schematic plan view illustrating a display device in accordance with an embodiment.

Referring to FIG. 1, a display device DD may include a base layer BSL and a pixel PXL disposed on the base layer BSL. For example, the display device DD may further include a driving circuit (e.g., a scan driver and a data driver) for driving the pixel PXL, wires, pads, and the like.

The display device DD (or the base layer BSL) may include a display area DA and a non-display area NDA. The non-display area NDA may refer to an area other than the display area DA. The non-display area NDA may surround at least a portion of the display area DA.

The base layer BSL may form a base surface of the display device DD. The base layer BSL may be a rigid substrate, a flexible substrate, or a film. For example, the base layer BSL may be a rigid substrate including glass or tempered glass, a flexible substrate (or a thin-film) including plastic or metal, or at least one insulating layer. The material and/or physical properties of the base layer BSL are not limited thereto.

The display area DA may refer to an area where the pixel PXL is disposed. The non-display area NDA may refer to an area where the pixel PXL is not disposed. The driving circuit, wires, and pads, which are connected to the pixel PXL of the display area DA, may be disposed in the non-display area NDA.

In accordance with an embodiment, the pixel PXL (or sub-pixels SPX) may be arranged according to a stripe or PENTILE™ array structure. However, embodiments are not limited thereto, and various embodiments may be implemented.

In accordance with an embodiment, the pixel PXL (or sub-pixels SPX) may include a first sub-pixel SPX1, a second sub-pixel SPX2, and a third sub-pixel SPX3. The first sub-pixel SPX1, the second sub-pixel SPX2, and the third sub-pixel SPX3 may each be a sub-pixel. At least one first sub-pixel SPX1, at least one second sub-pixel SPX2, and at least one third sub-pixel SPX3 may form a pixel unit (e.g., a single pixel unit) that emits light of various colors.

Each of the first sub-pixel SPX1, the second sub-pixel SPX2, and the third sub-pixel SPX3 may emit light of a certain color.

For example, the first sub-pixel SPX1 may be a red pixel that emits light of a red color (e.g., a first color), the second sub-pixel SPX2 may be a green pixel that emits light of a green color (e.g., a second color), and the third sub-pixel SPX3 may be a blue pixel that emits light of a blue color (e.g., a third color). The red pixel may provide light having a wavelength of about 600 nm to about 750 nm. The green pixel may provide light having a wavelength of about 480 nm to about 560 nm. The blue pixel may provide light having a wavelength of about 370 nm to about 460 nm.

In accordance with an embodiment, the number of second sub-pixels SPX2 may be greater than the number of first sub-pixels SPX1 and the number of third sub-pixels SPX3. However, the colors, types, and/or number of first sub-pixels SPX1, second sub-pixels SPX2, and third sub-pixels SPX3 forming each pixel unit are not limited to specific examples.

A display device DD including a wire grid polarization layer WGP in accordance with an embodiment will be described with reference to FIGS. 2 to 5.

Figure 2:
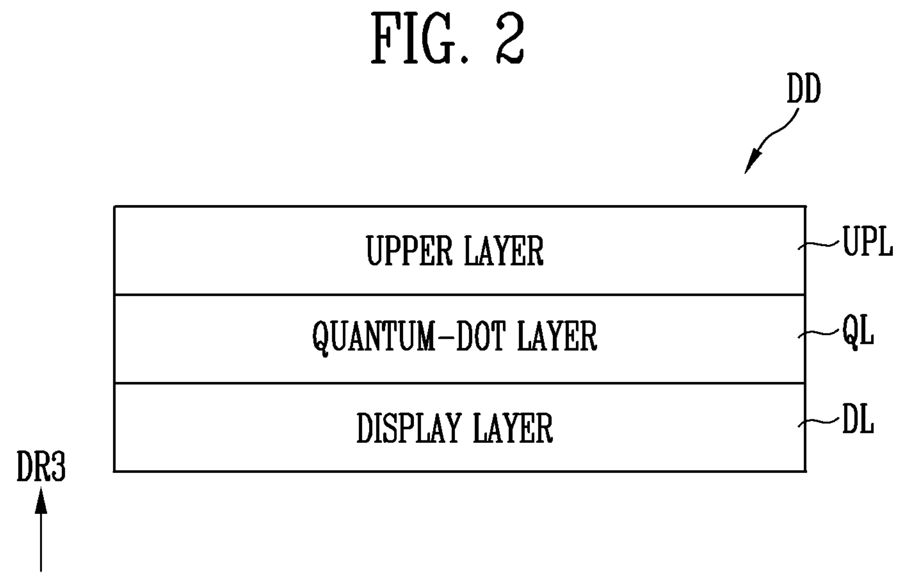
FIG. 2 is a schematic cross-sectional view illustrating a display device in accordance with an embodiment.
Figure 3:
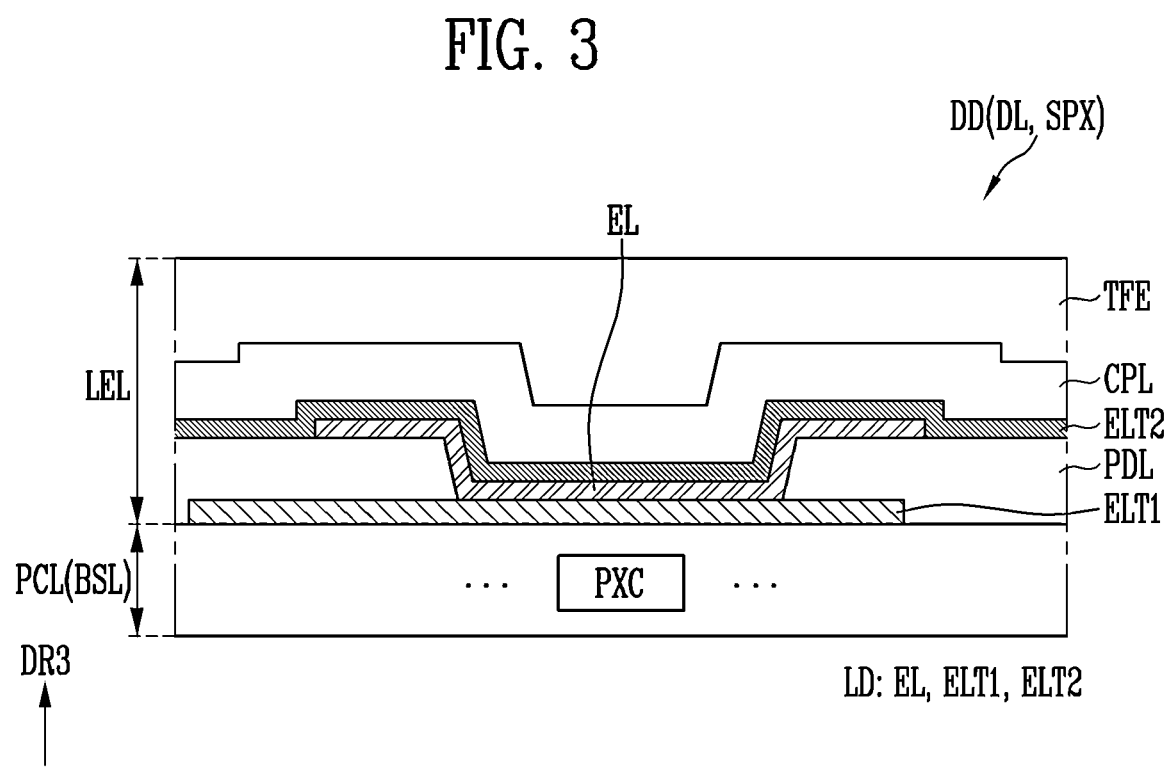
Figure 4:
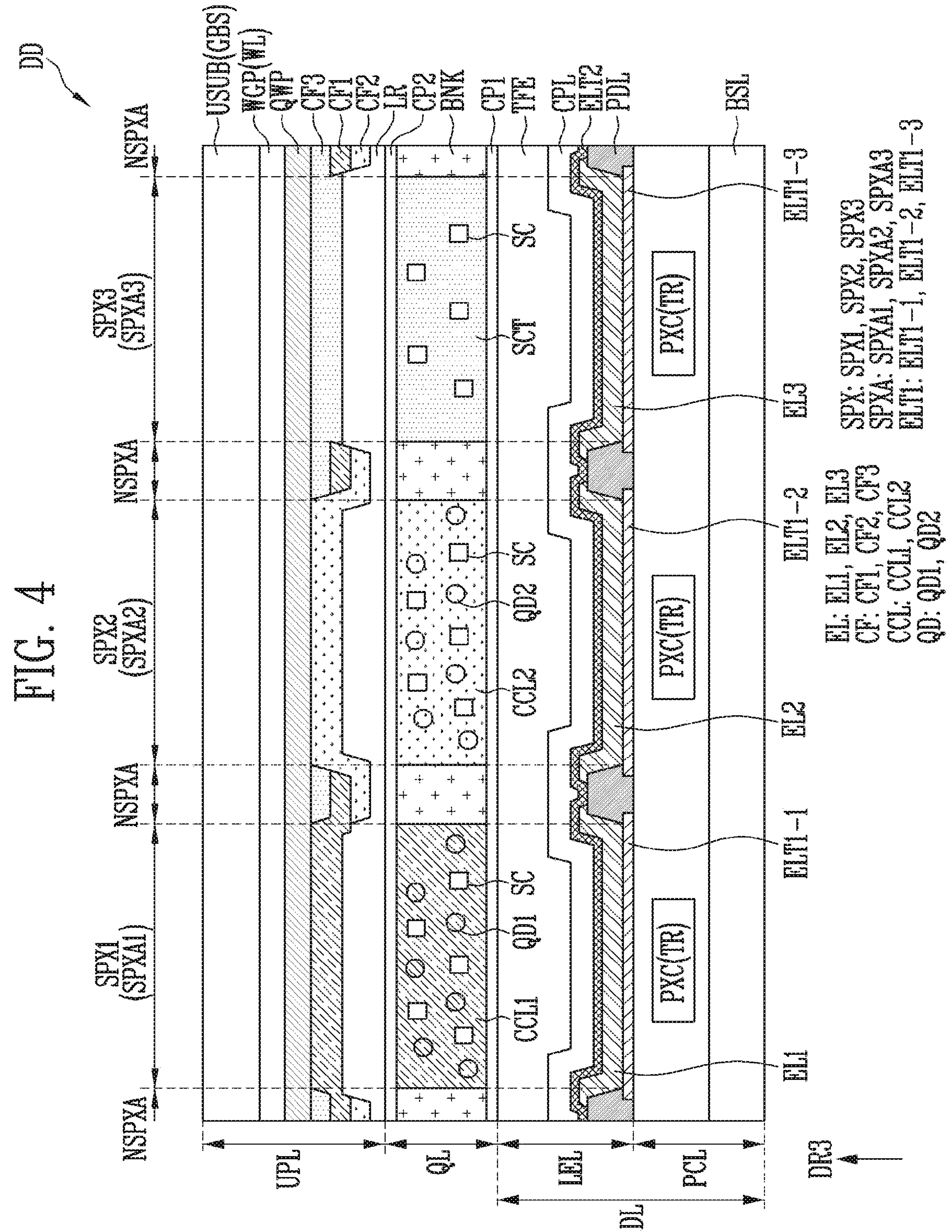
FIG. 4 is a schematic cross-sectional view illustrating a display device in accordance with an embodiment.
Figure 5:
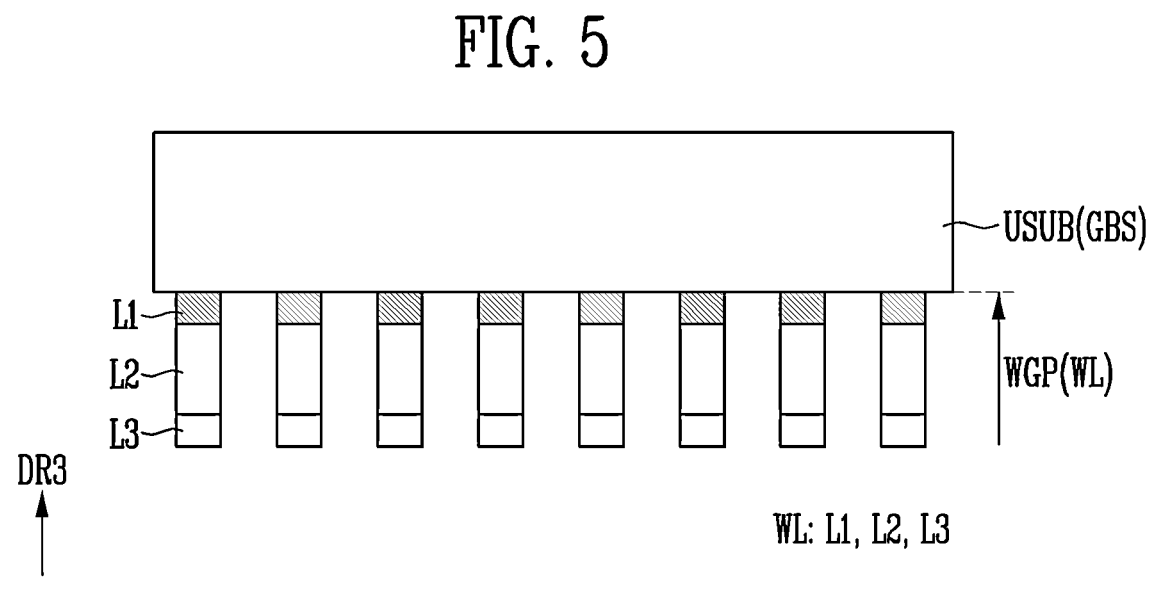

FIG. 2 is a schematic cross-sectional view illustrating a display device in accordance with an embodiment. FIG. 3 is a schematic cross-sectional view illustrating a display layer in accordance with an embodiment. FIG. 4 is a schematic cross-sectional view illustrating a display device in accordance with an embodiment. FIG. 5 is a schematic cross-sectional view illustrating a wire grid polarization layer in accordance with an embodiment.

Referring to FIGS. 2 to 5, a display device DD in accordance with an embodiment may include a display layer DL, a quantum-dot layer QL, and an upper layer UPL. The quantum-dot layer QL may be a bank layer.

The display layer DL may emit light. The display layer DL may form a base on which the quantum-dot layer QL is disposed.

The display layer DL may include a pixel-circuit layer PCL including a base layer BSL, and a light-emitting-element layer LEL. The light-emitting-element layer LEL may include a light emitting element LD and form a sub-pixel SPX.

The base layer BSL may form a base on which a pixel circuit PXC is disposed. The pixel circuit PXC may be disposed on the base layer BSL and may drive the light emitting element LD. The pixel-circuit layer PCL may include conductive layers and insulating layers, and the conductive layers may form the pixel circuit PXC. The pixel circuit PXC may include circuit elements that drive the sub-pixel SPX (or the light emitting element LD). The circuit elements may include a driving transistor and may include additional transistors and capacitors.

In accordance with an embodiment, the base layer BSL may be referred to as a first substrate. The base layer BSL may be referred to as a lower substrate.

The light-emitting-element layer LEL may be disposed on the pixel-circuit layer PCL. In accordance with an embodiment, the light-emitting-element layer LEL may include the light emitting element LD. The light emitting element LD may be an inorganic light emitting diode including an inorganic semiconductor, and the light emitting element LD may be an organic light emitting diode (OLED) including an organic material. However, embodiments are not limited thereto. For convenience of explanation, an embodiment in which the light emitting element LD includes an OLED will be described.

The light-emitting-element layer LEL may further include a pixel defining layer PDL, a capping layer CPL, and an encapsulation film (or encapsulation layer) TFE.

In accordance with an embodiment, the light emitting element LD may be disposed on the pixel-circuit layer PCL. The light emitting element LD may include a first light emitting element included in the first sub-pixel SPX1, a second light emitting element included in the second sub-pixel SPX2, and a third light emitting element included in the third sub-pixel SPX3. The first light emitting element may include a first emission unit EL1 and a first-first electrode ELT1-1. The second light emitting element may include a second emission unit EL2 and a second-first electrode ELT1-2. The third light emitting element may include a third emission unit EL3 and a third-first electrode ELT1-3.

In accordance with an embodiment, the light emitting element LD may include a first electrode ELT1 (e.g., ELT1-1, ELT1-2, and ELT1-3), an emission unit EL (e.g., EL1, EL2, and EL3), and a second electrode ELT2. In accordance with an embodiment, the emission unit EL may be disposed in an area defined by the pixel defining layer PDL. A surface of the emission unit EL may be electrically connected to the first electrode ELT1, and another surface of the emission unit EL may be electrically connected to the second electrode ELT2.

The first electrode ELT1 may be an anode electrode for the emission unit EL, and the second electrode ELT2 may be a cathode electrode for the emission unit EL. In accordance with an embodiment, the first electrode ELT1 and the second electrode ELT2 may each include a conductive material. For example, the conductive material may include one or more selected from the group consisting of gold (Au), silver (Ag), aluminum (Al), molybdenum (Mo), chromium (Cr), titanium (Ti), nickel (Ni), neodymium (Nd), copper (Cu), and platinum (Pt). In another example, in accordance with an embodiment, the conductive material may include one or more selected from the group consisting of silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and graphene However, embodiments are not limited thereto.

The emission unit EL may have a multilayer thin-film structure including a light generation layer (e.g., an emission layer). The emission unit EL may include a hole injection layer for injecting holes, a hole transport layer that has excellent hole transport properties and suppresses the movement of electrons that are combined in the emission layer to increase the opportunity of hole and electron recombination, an emission layer for emitting light by the recombination of the injected electrons and holes, an electron transport layer for smoothly transporting electrons to the emission layer, and an electron injection layer for injecting electrons. The emission unit EL may emit light based on electrical signals provided from the anode electrode (e.g., the first electrode ELT1) and the cathode electrode (e.g., the second electrode ELT2).

The pixel defining layer PDL may be disposed on the pixel-circuit layer PCL to define a position where the emission unit EL is disposed. The pixel defining layer PDL may include an organic material. For example, the pixel defining layer PDL may include one or more selected from the group consisting of acrylic resin, epoxy resin, phenol resin, polyamide resin, and polyimide resin. However, embodiments are not limited thereto. In accordance with another embodiment, the pixel defining layer PDL may include an inorganic material. For example, the pixel defining layer PDL may include silicon oxide ($SiO_x$) and/or silicon nitride ($SiN_x$). In accordance with an embodiment, the pixel defining layer PDL may have a multilayer structure in which a layer including silicon oxide ($SiO_x$) and a layer including silicon nitride ($SiN_x$) are stacked with each other.

The capping layer CPL may be disposed on the second electrode ELT2. The capping layer CPL may cap (or cover/encapsulate) the second electrode ELT2. The capping layer CPL may include an inorganic material.

The encapsulation film TFE may be disposed on the light emitting element LD (e.g., the second electrode ELT2). The encapsulation film TFE may eliminate or compensate a step difference generated by the light emitting element LD and the pixel defining layer PDL. The encapsulation film TFE may include insulating films that cover the light emitting element LD. In accordance with an embodiment, the encapsulation film TFE may have a structure in which inorganic films and organic films are alternately stacked with each other. In accordance with an embodiment, the encapsulation film TFE may be a thin-film encapsulation film.

In accordance with an embodiment, sub-pixel areas SPXA respectively corresponding to the sub-pixels SPX may be formed in the display area DA. The sub-pixel areas SPXA may include a first sub-pixel area SPXA1 corresponding to the first sub-pixel SPX1, a second sub-pixel area SPXA2 corresponding to the second sub-pixel SPX2, and a third sub-pixel area SPXA3 corresponding to the third sub-pixel SPX3.

The quantum-dot layer QL may be disposed on the display layer DL (e.g., the light-emitting-element layer LEL). The quantum-dot layer QL may be a layer on which a color conversion layer CCL and/or a scattering layer SCT are disposed.

The quantum-dot layer QL may include a first capping layer CP1, a bank BNK, a color conversion layer CCL, a scattering layer SCT, and a second capping layer CP2. The color conversion layer CCL may include a first color conversion layer CCL1 and a second color conversion layer CCL2.

The first capping layer CP1 may be disposed on the light-emitting-element layer LEL. In accordance with an embodiment, the first capping layer CP1 may cap (or cover/encapsulate) the lower portion of each of the first color conversion layer CCL1, the second color conversion layer CCL2, and the scattering layer SCT.

In accordance with an embodiment, the first capping layer CP1 may be provided (or formed) over the first to third sub-pixels SPX1, SPX2, and SPX3. In accordance with an embodiment, the first capping layer CP1 may be an inorganic layer and may include one or more selected from the group consisting of silicon nitride ($SiN_x$), aluminum nitride ($AlN_x$), titanium nitride ($TiN_x$), silicon oxide ($SiO_x$), aluminum oxide ($Al_xO_y$), titanium oxide ($TiO_x$), silicon oxycarbide ($SiO_xC_y$), and silicon oxynitride ($SiO_xN_y$). However, embodiments are not limited thereto.

The bank BNK may be disposed on the display layer DL (e.g., the light-emitting-element layer LEL). The bank BNK may be disposed between the sub-pixel areas SPXA.

The bank BNK may surround at least a portion of an area. For example, the bank BNK may surround at least a portion of the area for forming the sub-pixel area SPXA and may protrude in a thickness direction (e.g., a third direction DR3) of the base layer BSL. Accordingly, the bank BNK may form a space in which the first color conversion layer CCL1, the second color conversion layer CCL2, and the scattering layer SCT can be disposed (e.g., accommodated).

The bank BNK may include an organic material. In accordance with an embodiment, the bank BNK may include one or more selected from the group consisting of acrylic resin, epoxy resin, phenol resin, polyamide resin, and polyimide resin. However, embodiments are not limited thereto.

In accordance with an embodiment, the color conversion layer CCL may be disposed on the light-emitting-element layer LEL (e.g., the light emitting element LD). The color conversion layer CCL may change the wavelength of light. In accordance with an embodiment, the first to third sub-pixels SPX1, SPX2, and SPX3 may include light emitting elements LD that emit light of a same color. For example, the first to third sub-pixels SPX1, SPX2, and SPX3 may include light emitting elements LD that emit light of the third color (e.g., the blue color). A full-color image may be displayed by disposing (or forming) the color conversion layer CCL including color conversion particles on the first to third sub-pixels SPX1, SPX2, and SPX3, respectively.

However, the color of light emitted by the light emitting element LD is not limited to the above-described examples. For convenience of explanation, a description will be based on an embodiment in which the light emitting element LD of each sub-pixel SPX emits blue light.

The first color conversion layer CCL1 may include first color conversion particles that convert light of the third color emitted from the light emitting element LD into light of the first color. For example, the first color conversion layer CCL1 may include first quantum-dots QD1 dispersed in a matrix material such as base resin.

In accordance with an embodiment, in case that the light emitting element LD is a blue light emitting element and the first sub-pixel SPX1 is a red pixel, the first color conversion layer CCL1 may include first quantum-dots QD1 that convert blue light emitted from the blue light emitting element into red light. The first quantum-dots QD1 may absorb blue light and shift a wavelength according to an energy transition to emit red light. In case that the first sub-pixel SPX1 is a pixel of a different color, the first color conversion layer CCL1 may include first quantum-dots QD1 corresponding to the color of the first sub-pixel SPX1.

The second color conversion layer CCL2 may include second color conversion particles that convert light of the third color emitted from the light emitting element LD into light of the second color. For example, the second color conversion layer CCL2 may include second quantum-dots QD2 dispersed in a matrix material such as base resin.

In accordance with an embodiment, in case that the light emitting element LD is a blue light emitting element and the second sub-pixel SPX2 is a green pixel, the second color conversion layer CCL2 may include second quantum-dots QD2 that convert blue light emitted from the blue light emitting element into green light. The second quantum-dots QD2 may absorb blue light and shift a wavelength according to an energy transition to emit green light. In case that the second sub-pixel SPX2 is a pixel of a different color, the second color conversion layer CCL2 may include second quantum-dots QD2 corresponding to the color of the second sub-pixel SPX2.

In accordance with an embodiment, blue light having a relatively short wavelength in the visible light band is incident on the first quantum-dots QD1 and the second quantum-dots QD2 to increase absorption coefficients of the first quantum-dots QD1 and the second quantum-dots QD2. Therefore, the light efficiency finally emitted from the first sub-pixel SPX1 and the second sub-pixel SPX2 may be improved, and excellent color reproducibility may be ensured. For example, the first to third sub-pixels SPX1, SPX2, and SPX3 are formed by using the light emitting elements LD (e.g., the blue light emitting elements) of a same color, thereby increasing the manufacturing efficiency of the display device DD.

The scattering layer SCT may be provided (or formed) to efficiently use the light of the third color (or blue color) emitted from the light emitting element LD. For example, in case that the light emitting element LD is a blue light emitting element and the third sub-pixel SPX3 is a blue pixel, the scattering layer SCT may include at least one type of scatterer SC in order to efficiently use the light emitted from the light emitting element LD. As an example, the scatterer SC of the scattering layer SCT may include various light scattering particles or light scattering materials. For example, the scatterer SC may include one or more selected from the group consisting of titanium oxide ($TiO_x$), silica ($SiO_x$) (e.g., silica bead, hollow silica, etc.), zirconium oxide ($ZrO_x$), aluminum oxide ($Al_xO_y$), indium oxide ($In_xO_y$), zinc oxide ($ZnO_x$), tin oxide ($SnO_x$), and antimony oxide ($Sb_xO_y$).

For example, the scatterer SC may not be disposed only in the third sub-pixel SPX3. In accordance with an embodiment, the scatterer SC may be disposed (or included) in the first color conversion layer CCL1. The scatterer SC may be disposed (or included) in the second color conversion layer CCL2.

The second capping layer CP2 may be disposed on each of the first color conversion layer CCL1, the second color conversion layer CCL2, and the scattering layer SCT, and may cap (or cover/encapsulate) each of the first color conversion layer CCL1, the second color conversion layer CCL2, and the scattering layer SCT.

In accordance with an embodiment, the second capping layer CP2 may be provided (or formed) over the first to third sub-pixels SPX1, SPX2, and SPX3. In accordance with an embodiment, the second capping layer CP2 may be an inorganic layer and may include one or more selected from the group consisting of silicon nitride ($SiN_x$), aluminum nitride ($AlN_x$), titanium nitride ($TiN_x$), silicon oxide ($SiO_x$), aluminum oxide ($Al_xO_y$), titanium oxide ($TiO_x$), silicon oxycarbide ($SiO_xC_y$), and silicon oxynitride ($SiO_xN_y$). However, embodiments are not limited thereto.

The upper layer UPL may be disposed on the quantum-dot layer QL. In accordance with an embodiment, light provided from the display layer DL may be emitted to the outside through the upper layer UPL.

The upper layer UPL may include an optical layer LR, a color filter layer CF, a phase retardation layer QWP, a wire grid polarization layer WGP, and an upper substrate USUB.

The optical layer LR may be disposed on the quantum-dot layer QL (e.g., the second capping layer CP2). In accordance with an embodiment, the optical layer LR may be disposed below the color filter layer CF. The optical layer LR and the color filter layer CF may be adjacent (e.g., directly adjacent) to each other to form an interface.

The optical layer LR may have a higher refractive index than the layers forming the color filter layer CF. The optical layer LR may have a smaller refractive index than the layers forming the quantum-dot layer QL (e.g., the color conversion layer CCL and the scattering layer SCT) and may form a light recycling structure.

The optical layer LR may include various materials so as to have a single refractive index. For example, the optical layer LR may include various resins and hollow silica. In another example, the optical layer LR may include zirconium oxide ($ZrO_x$). However, embodiments are not limited thereto.

In accordance with an embodiment, the optical layer LR may be referred to as a low refractive index layer.

The color filter layer CF may be disposed on the optical layer LR. The color filter layer CF may be disposed below the phase retardation layer QWP. The color filter layer CF may include a first color filter CF1 included in (e.g., corresponding to) the first sub-pixel SPX1, a second color filter CF2 included in (e.g., corresponding to) the second sub-pixel SPX2, and a third color filter CF3 included in (e.g., corresponding to) the third sub-pixel SPX3.

The first color filter CF1 may be disposed in the first sub-pixel area SPXA1. The first color filter CF1 may include a color filter material (e.g., dye or pigment) that selectively transmits light of the first color (e.g., the red color).

The second color filter CF2 may be disposed in the second sub-pixel area SPXA2. The second color filter CF2 may include a color filter material (e.g., dye or pigment) that selectively transmits light of the second color (e.g., the green color).

The third color filter CF3 may be disposed in the third sub-pixel area SPXA3. The third color filter CF3 may include a color filter material (e.g., dye or pigment) that selectively transmits light of the third color (e.g., the blue color).

In accordance with an embodiment, a non-sub-pixel area NSPXA, in which light of a color is not visible, may be formed between the sub-pixel areas SPXA. In accordance with an embodiment, the first color filter CF1, the second color filter CF2, and the third color filter CF3 may overlap each other in a plan view within the non-sub-pixel area NSPXA.

The phase retardation layer QWP may be disposed on the color filter layer CF. The phase retardation layer QWP may be disposed below the wire grid polarization layer WGP. The phase retardation layer QWP may be closer to the upper substrate USUB than the color conversion layer CCL.

In accordance with an embodiment, the phase retardation layer QWP may be adjacent (e.g., directly adjacent) to the wire grid polarization layer WGP. For example, the phase retardation layer QWP may be in contact with (e.g., in physical contact with) the wire grid polarization layer WGP.

In accordance with an embodiment, the phase retardation layer QWP may include a $\lambda/4$ phase retardation film. Experimentally, the $\lambda/4$ phase retardation film may be substantially parallel to the optical axis of the phase retardation layer QWP and may form a phase difference of about $\lambda/4$ in two polarization components perpendicular to each other. Accordingly, the $\lambda/4$ phase retardation film may change linearly polarized light into circularly polarized light or change circularly polarized light into linearly polarized light.

The phase retardation layer QWP may retard the phase of incident light. In accordance with an embodiment, the phase retardation layer QWP may include one or more selected from the group consisting of a birefringent film including a polymer, a liquid crystal alignment film, and an alignment layer of liquid crystal polymer formed on a substrate. However, embodiments are not limited thereto.

The wire grid polarization layer WGP may be disposed on the phase retardation layer QWP. The wire grid polarization layer WGP may be disposed below the upper substrate USUB.

In accordance with an embodiment, the wire grid polarization layer WGP may be adjacent (e.g., directly adjacent) to the phase retardation layer QWP. The wire grid polarization layer WGP may be in contact with (e.g., in physical contact with) the phase retardation layer QWP.

In accordance with an embodiment, the wire grid polarization layer WGP may linearly polarize incident light. The wire grid polarization layer WGP may include a wire grid pattern layer WL. The wire grid polarization layer WGP may include a structure in which the wire grid pattern layer WL is patterned and periodically disposed on a substrate (e.g., a grid base GBS).

In accordance with an embodiment, the wire grid polarization layer WGP may include a reflection-type polarization structure. In accordance with an embodiment, the wire grid polarization layer WGP may not include an absorption-type polarization structure.

For example, the wire grid polarization layer WGP may reflect polarized light parallel to the pattern direction of the wire grid pattern layer WL. The wire grid polarization layer WGP may transmit polarized light perpendicular to the pattern direction of the wire grid pattern layer WL. In accordance with an embodiment, the wire grid polarization layer WGP may include a reflection-type polarization structure, and reflected light may be recycled. In this regard, details are described below with reference to FIG. 6.

In accordance with an embodiment, the wire grid polarization layer WGP may be adjacent (e.g., directly adjacent) to the upper substrate USUB. For example, the upper substrate USUB may be the grid base GBS for patterning the wire grid pattern layer WL.

In accordance with an embodiment, the wire grid pattern layer WL may be manufactured by etching the conductive layers and the insulating layer formed (e.g., deposited) on the grid base GBS forming the upper substrate USUB.

For example, a first base layer for forming a first layer L1, a second base layer for forming a second layer L2, and a third base layer for forming a third layer L3 may be deposited on the upper substrate USUB, and the first base layer, the second base layer, and the third base layer may be collectively etched to provide the first layer L1, the second layer L2, and the third layer L3.

In accordance with an embodiment, the upper substrate USUB may be a base substrate for forming the phase retardation layer QWP, the color filter layer CF, the optical layer LR, and the quantum-dot layer QL in subsequent processes. In accordance with an embodiment, the quantum-dot layer QL may be manufactured only after the wire grid polarization layer WGP is patterned on the upper substrate USUB. For example, the risk of the quantum-dot layer QL being damaged due to the process environment (e.g., high temperature) for manufacturing the wire grid polarization layer WGP and the like may be prevented.

The pitches of the wire grid pattern layer WL may be determined based on the wavelength of light provided from the display layer DL and may each have a predetermined aspect ratio. However, embodiments are not limited thereto.

In accordance with an embodiment, the wire grid pattern layer WL may include the first layer L1, the second layer L2, and the third layer L3.

The first layer L1 may be a layer closest to the grid base GBS among the layers forming the wire grid pattern layer WL. The first layer L1 may be adjacent (e.g., directly adjacent) to the grid base GBS.

The first layer L1 may reduce external light reflection for the display device DD. For example, the first layer L1 may absorb at least a portion of external light.

In accordance with an embodiment, the first layer L1 may include a different metal material from the second layer L2. For example, the first layer L1 may include molybdenum tantalum oxide ($MoTaO_x$). $MoTaO_x$ may be a mixed material of molybdenum oxide ($MoO_x$) and tantalum (Ta). However, embodiments are not limited thereto.

In accordance with an embodiment, the first layer L1 may include $MoTaO_x$, and the thickness of the first layer L1 may range from about 350 nm to about 550 nm. In accordance with an embodiment, the thickness of the first layer L1 may range from about 400 nm to about 500 nm. The thickness may be defined based on a direction (e.g., the third direction DR3) in which the first layer L1 and the second layer L2 are spaced apart from each other. In case that the thickness of the first layer L1 satisfies the above-mentioned numerical range, the wire grid polarization layer WGP may have excellent low-reflection characteristics. An experimental example related to this will be described below with reference to FIG. 7.

The second layer L2 may be disposed between the first layer L1 and the third layer L3. The second layer L2 may include a reflection wall.

The second layer L2 may reflect at least a portion of internal light. Accordingly, the wire grid polarization layer WGP may include a reflection-type polarization structure.

In accordance with an embodiment, the second layer L2 may include a reflective metal material. For example, the second layer L2 may include aluminum (Al). However, embodiments are not limited thereto.

The third layer L3 may be disposed on the second layer L2. The third layer L3 may cover at least a portion of the second layer L2.

The third layer L3 may protect other portions of the wire grid pattern layer WL. For example, the third layer L3 may be an oxidation prevention layer of the first layer L1 and the second layer L2.

In accordance with an embodiment, the third layer L3 may include various materials. For example, the third layer L3 may include silicon oxide ($SiO_x$) or molybdenum (Mo). However, embodiments are not limited thereto.

In accordance with an embodiment, the wire grid polarization layer WGP may further include a protection layer disposed between the wire grid pattern layers WL and covering the layers L1, L2, and L3. The protection layer may include a transparent material.

The upper substrate USUB may be disposed on the wire grid polarization layer WGP. In accordance with an embodiment, as described above, the upper substrate USUB may be a manufacturing substrate for manufacturing the wire grid polarization layer WGP and may be a grid base GBS.

In accordance with an embodiment, the upper substrate USUB may include a glass substrate (e.g., a glass material). However, embodiments are not limited thereto.

The optical path in the display device DD in accordance with an embodiment will be described with reference to FIG. 6.

Figure 6:
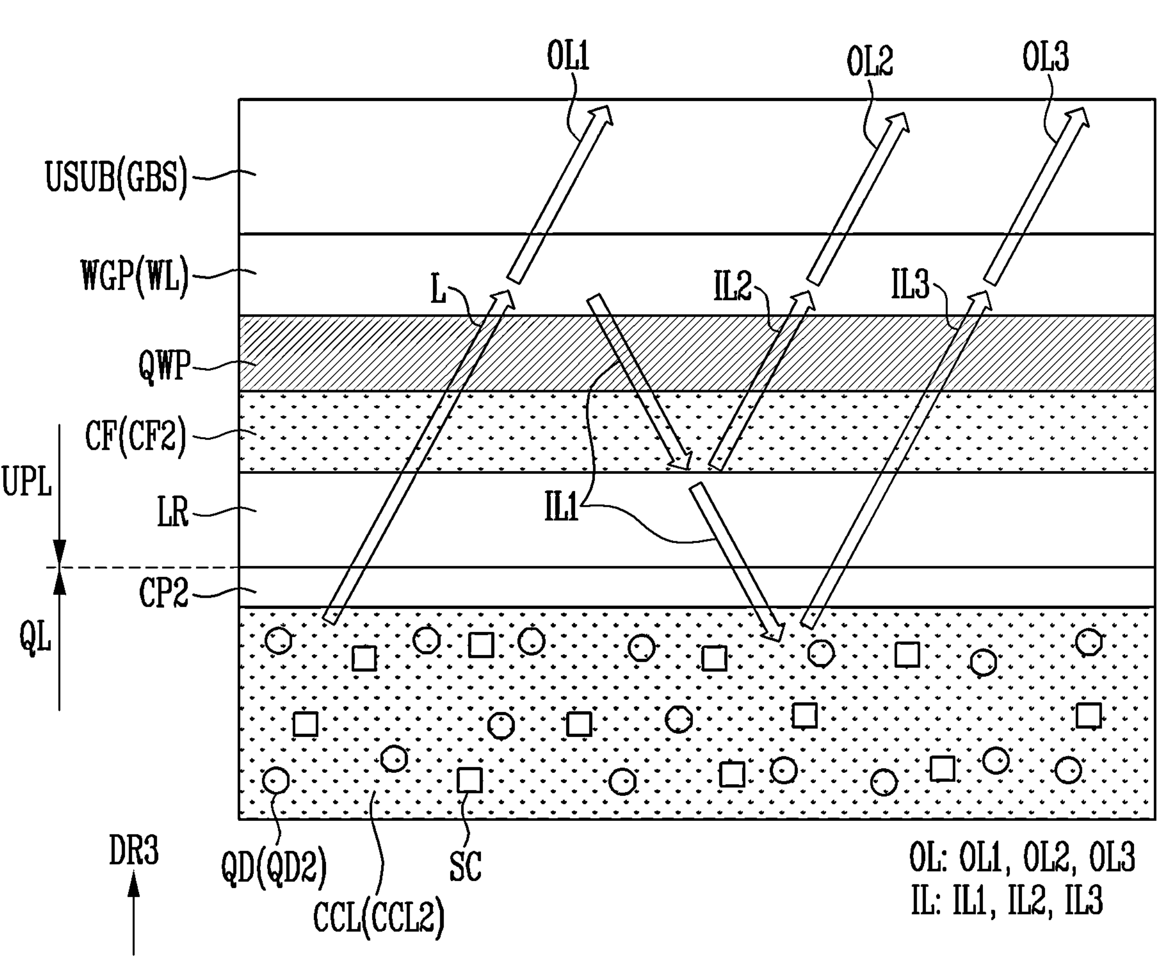
FIG. 6 is a schematic cross-sectional view illustrating an optical path in a display device in accordance with an embodiment.

FIG. 6 is a schematic cross-sectional view illustrating the optical path in the display device in accordance with an embodiment.

For convenience of explanation, the hatching of the color filter layer CF and the color conversion layer CCL in FIG. 6 is expressed based on the layers included in the second sub-pixel SPX2. For example, the technical features described with reference to FIG. 6 may also be applied to the first sub-pixel SPX1 and the third sub-pixel SPX3. For example, the following description will be given based on the color conversion layer CCL, but a corresponding (e.g., substantially identical or similar) optical path may also be defined (or formed) in the scattering layer SCT.

For convenience of explanation, FIG. 6 illustrates the color conversion layer CCL and elements disposed above the color conversion layer CCL, based on the color conversion layer CCL and a light exit path (or optical path).

FIG. 6 illustrates examples of light exit paths of light provided from the display layer DL (e.g., the light emitting element LD).

FIG. 6 schematically illustrates optical paths of scattered light L provided from the display layer DL, scattered by the color conversion layer CCL (or the scattering layer SCT), and then emitted in the light exit direction, internal light IL defined (or formed) in the internal structure of the display device DD, and output light OL emitted to the outside. The internal light IL may include first internal light IL1, second internal light IL2, and third internal light IL3. The output light OL may include first output light OL1, second output light OL2, and third output light OL3.

The light provided from the display layer DL (e.g., the light emitting element LD) may be scattered by the scatterer SC in the color conversion layer CCL and then emitted to the outside. Accordingly, the scattered light L provided (e.g., scattered) by the color conversion layer CCL may be directed upward.

The scattered light L may pass through the second capping layer CP2, the optical layer LR, and the color filter layer CF, a portion of the scattered light L may pass through the phase retardation layer QWP and the wire grid polarization layer WGP and may be provided as linearly polarized first output light OL1, and another portion of the scattered light L may pass through the phase retardation layer QWP, may be reflected by the wire grid polarization layer WGP, and may be provided as the first internal light IL1.

The scattered light L may pass through the phase retardation layer QWP and be provided as circularly polarized light defined by a first rotation direction. Accordingly, a portion of the scattered light L may pass through the wire grid polarization layer WGP, and the linearly polarized first output light OL1 may be emitted. For example, the first internal light IL1 that is reflected and directed inward may still be provided as circularly polarized light defined by the first rotation direction.

The first internal light IL1 may pass through the phase retardation layer QWP and the color filter layer CF, a portion of the first internal light IL1 may be reflected at the interface between the color filter layer CF and the optical layer LR and provided as the second internal light IL2, and another portion of the first internal light IL1 may pass through the optical layer LR and the second capping layer CP2 and be provided again to the color conversion layer CCL.

The second internal light IL2 may be reflected at the interface between the color filter layer CF and the optical layer LR and may be provided as circularly polarized light defined in a second rotation direction different from the first rotation direction. Accordingly, the second internal light IL2 may include an optical component that passes through the phase retardation layer QWP. The second internal light IL2 may pass through the phase retardation layer QWP and the wire grid polarization layer WGP and may be provided as linearly polarized second output light OL2.

The first internal light IL1 provided again to the color conversion layer CCL may be scattered by the scatterer SC to form third internal light IL3 directed in the light exit direction (e.g., the third direction DR3).

The third internal light IL3 may pass through the second capping layer CP2, the optical layer LR, and the color filter layer CF, and the third internal light IL3 may be provided as circularly polarized light through the phase retardation layer QWP. Accordingly, the third internal light IL3 may pass through the wire grid polarization layer WGP. The third internal light IL3 having passed through the wire grid polarization layer WGP may be provided as linearly polarized third output light OL3.

In accordance with an embodiment, the reflection-type polarization structure may be provided in which the wire grid polarization layer WGP and the phase retardation layer QWP are disposed adjacent to the upper substrate USUB such that light recycling may be performed more efficiently.

In the light recycling structure in accordance with such an embodiment, the wire grid polarization layer WGP and the phase retardation layer QWP may be disposed in this stated order on the upper portion of the quantum-dot layer QL including the quantum-dots QD and the scatterers SC, and thus, the paths of light (e.g., internal light IL) defined (or formed) inside the display device DD may be defined (or formed) in various ways, but may ultimately be emitted to the outside.

In accordance with an embodiment, the light output efficiency may be improved, and the light outputted to the outside may be linearly polarized.

In accordance with an embodiment, the wire grid polarization layer WGP may have excellent low-reflection characteristics. In this regard, the low-reflection characteristics of the wire grid polarization layer WGP in accordance with an embodiment will be described with reference to FIG. 7.

Figure 7:
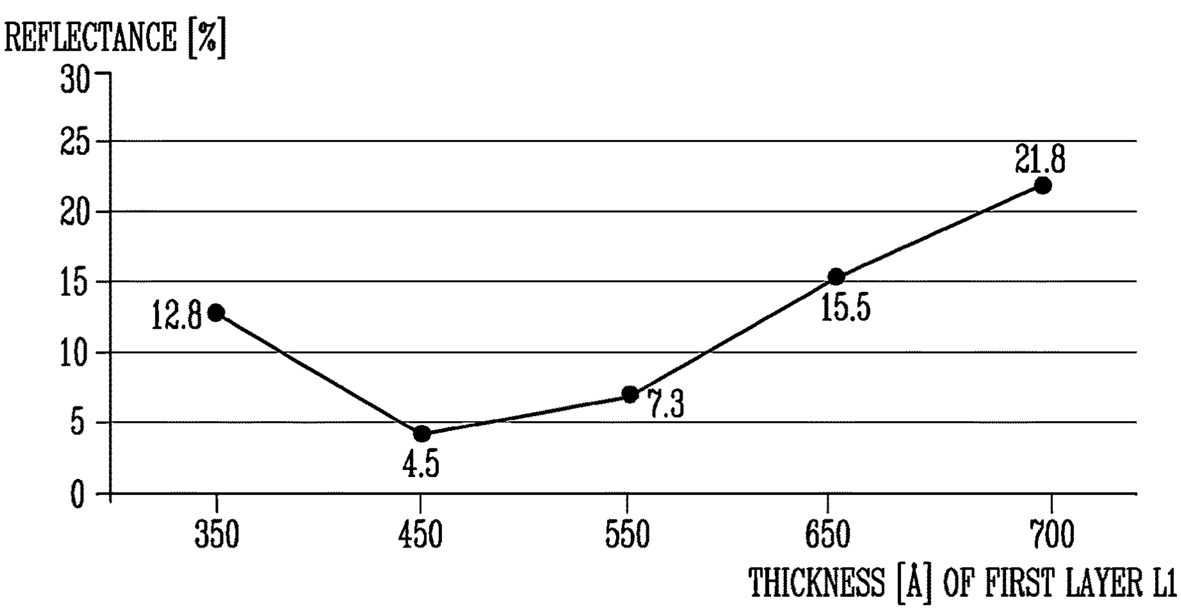
FIG. 7 is a graph showing the results of an experiment performed to explain the low-reflection characteristics of the wire grid polarization layer in accordance with an embodiment.

FIG. 7 is a graph showing the results of an experiment performed to explain the low-reflection characteristics of the wire grid polarization layer in accordance with an embodiment.

This experiment shows reflectance according to the thickness of the first layer L1 included in the wire grid polarization layer WGP in accordance with an embodiment. This experiment was conducted on the basis that the first layer L1 included $MoTaO_x$. For example, the reflectance of $MoTaO_x$ was measured by applying light of about 550 nm with changing the thickness of $MoTaO_x$.

Referring to the experimental results of FIG. 7, it is confirmed that in case that the first layer L1 has a thickness of about 350 nm to about 550 nm, the first layer L1 has excellent low-reflection characteristics. Accordingly, in case that the wire grid polarization layer WGP in accordance with an embodiment includes the first layer L1 having a thickness of about 350 nm to about 550 nm, the wire grid polarization layer WGP may have excellent low-reflection characteristics.

An embodiment in which the display device DD further includes a light controlling layer LCL will be described with reference to FIGS. 8 to 11. Details redundant to those described above are briefly described, or a description thereof is not repeated for descriptive convenience.

Figure 8:
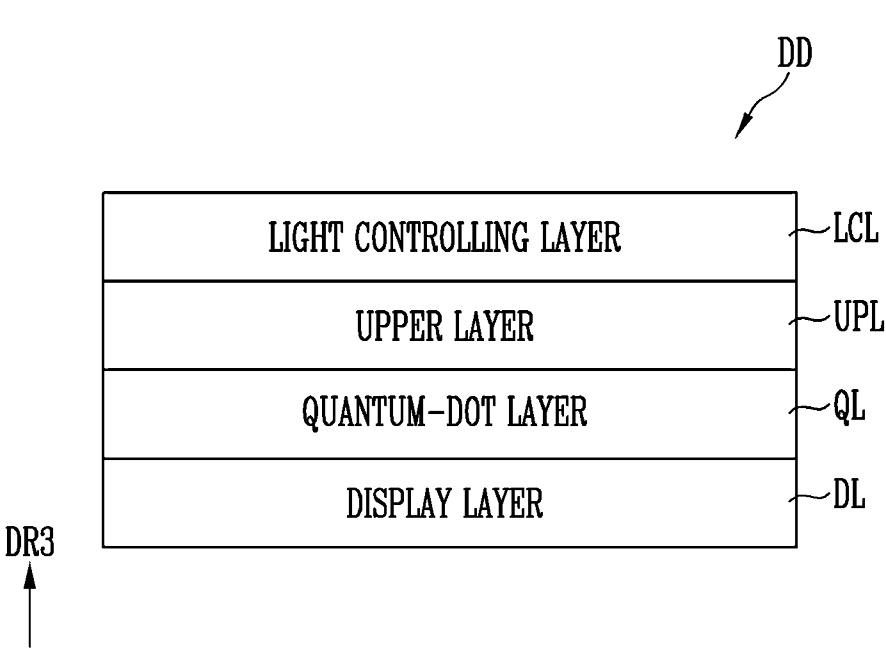
FIG. 8 is a schematic cross-sectional view illustrating a display device in accordance with an embodiment.
Figure 9:
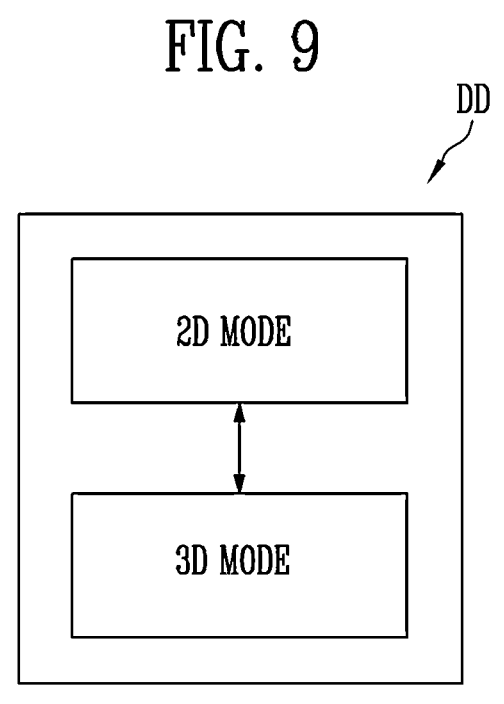
Figure 10:
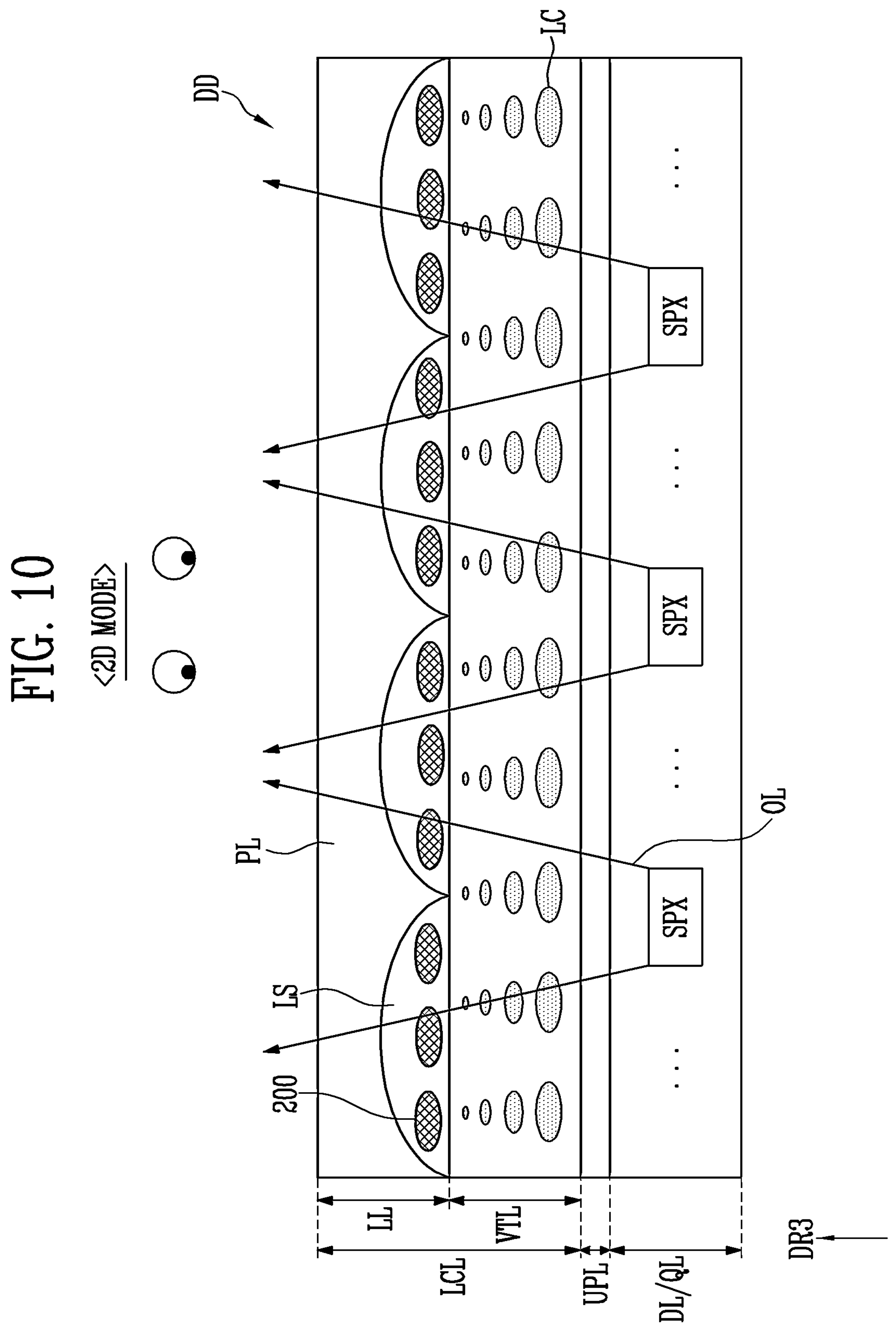
FIG. 10 is a schematic cross-sectional view for describing a two-dimensional (2D) image mode of a display device in accordance with an embodiment.
Figure 11:
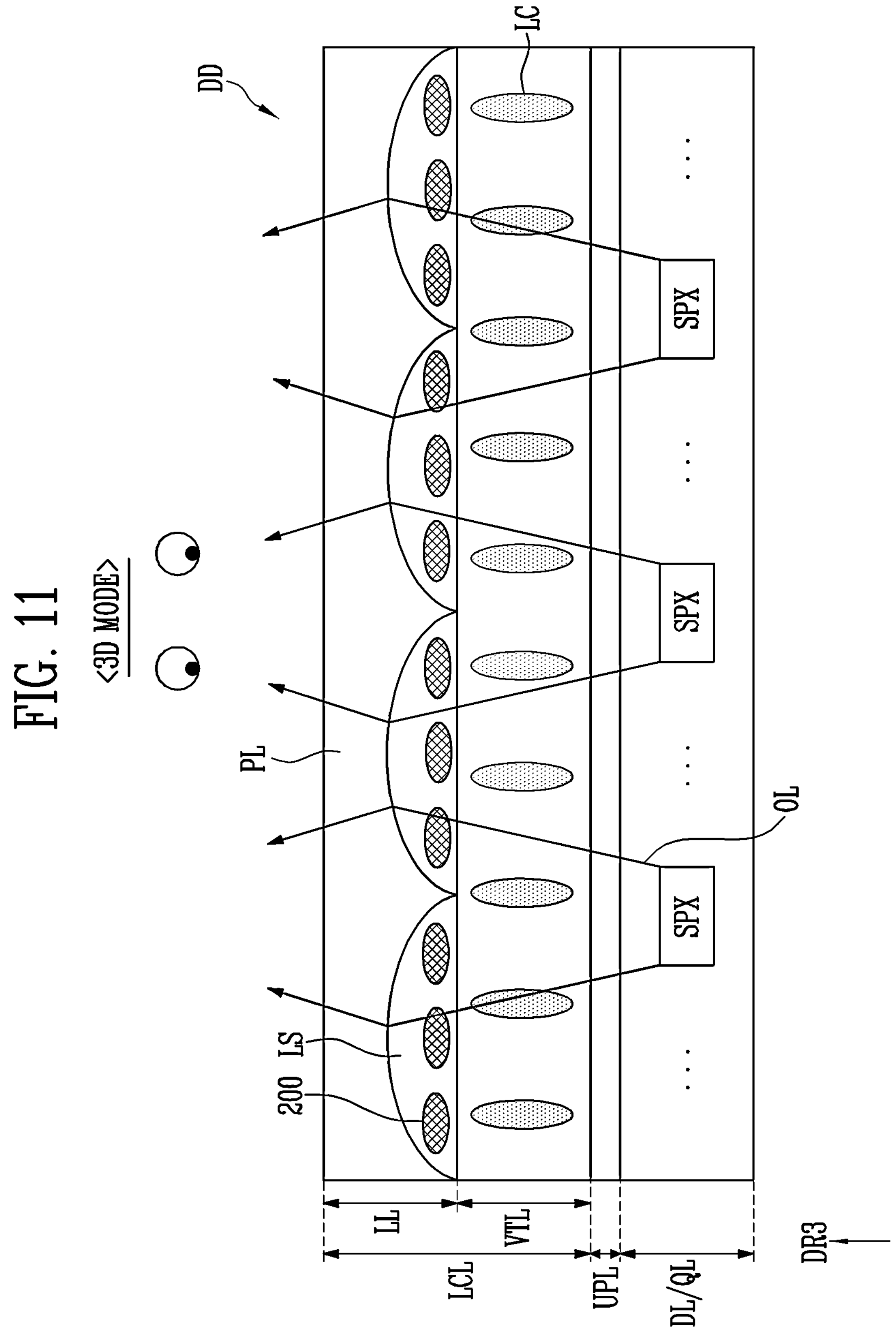
FIG. 11 is a schematic cross-sectional view for describing a three-dimensional (3D) image mode of a display device in accordance with an embodiment.

FIG. 8 is a schematic cross-sectional view illustrating a display device in accordance with an embodiment. FIG. 9 is a schematic block diagram illustrating an operation mode of a display device in accordance with an embodiment. FIG. 10 is a schematic cross-sectional view for describing a two-dimensional (2D) image mode of a display device in accordance with an embodiment. FIG. 11 is a schematic cross-sectional view for describing a three-dimensional (3D) image mode of a display device in accordance with an embodiment.

In accordance with an embodiment, a display device DD may further include a light controlling layer LCL capable of implementing a 3D image.

The light controlling layer LCL may be disposed on the upper layer UPL. Accordingly, the light controlling layer LCL may be disposed on the upper substrate USUB that is disposed on the wire grid polarization layer WGP. In conjunction with the foregoing description, in accordance with an embodiment, the light provided from the display layer DL may pass through the upper substrate USUB and may be linearly polarized. Linearly polarized output light OL may be provided (e.g., inputted) to the light controlling layer LCL.

In accordance with an embodiment, the display device DD may include the light controlling layer LCL and implement a light field display. For example, referring to FIG. 9, the display device DD may operate in a 2D image mode or a 3D image mode. For example, the display device DD may include a controller for changing the operation mode, and the controller may change the operation mode of the display device DD based on a preset criterion, a user input, and the like. The controller may be implemented by including one of software, hardware, firmware, and application. However, embodiments are not limited thereto.

In accordance with an embodiment, in case that the display device DD operates in the 3D image mode, the display device DD may implement a 3D image by forming a light field expressed as a vector distribution (e.g., intensity, direction, etc.) of light in space by using a lens layer LL. The light field display may be implemented in case that the display device DD operates in the 3D image mode such that the depth and side of an object may be displayed or implemented. Therefore, the light field display may implement more natural 3D images, and thus, may be a display technology expected to be variously used through convergence with augmented reality (AR) technology.

For example, the display device DD may also operate in the 2D image mode. In case that the display device DD operates in the 2D image mode, the display device DD may provide an entire image in the display area DA.

In accordance with an embodiment, the display device DD may selectively operate in the 2D image mode and the 3D image mode, and the operation mode may be appropriately selected according to an image reproduction environment to be used.

In accordance with an embodiment, the light controlling layer LCL may include a variable light transmission layer VTL and a lens layer LL.

The variable light transmission layer VTL may be driven in a twisted nematic (TN) liquid crystal mode having a $\lambda/2$ phase difference. However, this is only an example, and the variable light transmission layer VTL may be driven in a liquid crystal mode, such as vertical alignment (VA), optical compensated bend (OCB), or electrically controlled birefringence (ECB).

In accordance with an embodiment, the variable light transmission layer VTL may include liquid crystal molecules LC. The arrangement (or alignment) of the liquid crystal molecules LC may be changed based on an electrical signal provided to the variable light transmission layer VTL.

The lens layer LL may be disposed on the variable light transmission layer VTL. The lens layer LL may include lenses LS and a peripheral layer PL that covers the lenses LS.

The lens layer LL may be implemented in various structures. For example, the lens layer LL may be implemented as a lenticular lens array, microlens array, and the like.

The lens layer LL may or may not refract the light transmitted through the variable light transmission layer VTL. For example, in case that the display device DD operates in the 2D image mode, the lens layer LL may transmit (e.g., directly transmit) the image (e.g., the output light OL) provided from the display layer DL (e.g., the sub-pixel SPX). In case that the display device DD operates in the 3D image mode, the lens layer LL may separate the viewing area of the image provided from the display layer DL. In case that the display device DD operates in the 3D image mode, the lens layer LL may form an image in a corresponding viewing area for each viewpoint image based on (e.g., using) the diffraction and refraction phenomenon of light in the multi-viewpoint image formed by the display layer DL.

The lenses LS may refract the light provided from the display layer DL according to the driving state of the variable light transmission layer VTL. For example, in case that the liquid crystal molecules LC of the variable light transmission layer VTL are in a first alignment state (e.g., an alignment state for operating in the 3D image mode, see FIG. 11), the lenses LS may refract light to form a light field. For example, a 3D image may be implemented by the lenses LS. In another example, in case that the liquid crystal molecules LC of the variable light transmission layer VTL are in a second alignment state different from the first alignment state (e.g., an alignment state for operating in the 2D image mode, see FIG. 10), the lenses LS may not refract light, and e.g., a 2D image may be implemented (or displayed).

The lenses LS may be a liquid crystal type lens array. For example, the lenses LS may include lens liquid crystal molecules 200. The lens liquid crystal molecules 200 may be aligned in a direction.

In accordance with an embodiment, the lenses LS may include the lens liquid crystal molecules 200 and may or may not form a refractive surface with the peripheral layer PL according to the operation state of the display device DD.

For example, in case that the display device DD operates in the 3D image mode, the lenses LS including the lens liquid crystal molecules 200 and the peripheral layer PL may form an interface that induces light refraction. In case that the display device DD operates in the 2D image mode, the interface between the lenses LS including the lens liquid crystal molecules 200 and the peripheral layer PL may not refract the provided light.

In accordance with an embodiment, in order to implement the light field display using the light controlling layer LCL, input light of the display device DD may need to be linearly polarized. As described above, in accordance with an embodiment, the upper layer UPL including the wire grid polarization layer WGP may be provided so that excellent light output efficiency may be obtained and the linearly polarized output light OL may be provided. Accordingly, in accordance with an embodiment, the display device DD, which does not cause light loss through the light recycling structure, may have excellent low-reflection characteristics, and may be capable of implementing the light field display can be provided.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display device comprising:
- a display layer comprising:
  - a lower substrate,
  - a pixel-circuit layer comprising a pixel circuit disposed on the lower substrate, and
  - a light emitting element electrically connected to the pixel circuit;
- a quantum-dot layer disposed on the display layer and comprising a color conversion layer and a scattering layer; and
- an upper layer disposed above the quantum-dot layer, the upper layer comprising:
  - an optical layer,
  - a color filter layer on the optical layer and partially overlapping the optical layer in a direction orthogonal to a thickness direction of the display device,
  - a phase retardation layer on the color filter layer,
  - a wire grid polarization layer on the phase retardation layer,
  - an upper substrate directly on the wire grid polarization layer, wherein the color filter layer comprises a color filter overlapping with the light emitting element in the thickness direction, and wherein the color filter and the optical layer are in direct contact with each other.

2. The display device of claim 1, wherein the wire grid polarization layer comprises wire grid pattern layers disposed below the upper substrate, the wire grid pattern layers each comprise:

a first layer disposed on the upper substrate;

a second layer disposed on the first layer; and a third layer disposed on the second layer, and the first layer and the second layer include different metal materials from each other.

3. The display device of claim 2, wherein the first layer absorbs at least a portion of light incident to the first layer, and the second layer reflects at least a portion of light incident to the second layer.

4. The display device of claim 2, wherein the first layer includes molybdenum tantalum oxide ($MoTaO_x$), and the second layer includes aluminum (Al).

5. The display device of claim 4, wherein a thickness of the first layer is in a range of about 350 nm to about 550 nm.

6. The display device of claim 2, wherein the first layer is in contact with the upper substrate.

7. The display device of claim 6, wherein the upper substrate includes a glass material.

8. The display device of claim 2, wherein the phase retardation layer includes a λ/4 phase retardation film.

9. The display device of claim 8, wherein the phase retardation layer and the wire grid polarization layer are directly adjacent to each other.

10. The display device of claim 2, wherein the optical layer is disposed on the quantum-dot layer, and the optical layer and the color filter layer are directly adjacent to each other to form an interface.

11. The display device of claim 10, wherein a refractive index of the optical layer is greater than a refractive index of the color filter layer and smaller than a refractive index of the color conversion layer.

12. The display device of claim 1, further comprising:

a first sub-pixel forming a first sub-pixel area where light of a first color is provided, a second sub-pixel forming a second sub-pixel area where light of a second color is provided, and a third sub-pixel forming a third sub-pixel area where light of a third color is provided, wherein the color conversion layer comprises:

a first color conversion layer disposed in the first sub-pixel area, and a second color conversion layer disposed in the second sub-pixel area, and the quantum-dot layer further comprises a scattering layer disposed in the third sub-pixel area.

13. The display device of claim 12, wherein the first color conversion layer, the second color conversion layer, and the scattering layer each include a scatterer.

14. The display device of claim 1, further comprising:

a light controlling layer disposed on the upper layer, wherein the light controlling layer comprises:

a variable light transmission layer including liquid crystal molecules; and a lens layer disposed on the variable light transmission layer and comprising lenses and a peripheral layer disposed on the lenses.

15. The display device of claim 14, wherein light provided by the display layer is provided as linearly polarized output light and is inputted to the light controlling layer, the lenses and the peripheral layer form an interface, the display device operates in a two-dimensional (2D) image mode for displaying a 2D image or a three-dimensional (3D) image mode for displaying a 3D image, in case that the display device operates in the 2D image mode, the linearly polarized output light is transmitted without refraction at the interface, and in case that the display device operates in the 3D image mode, the linearly polarized output light is refracted at the interface.

16. An electronic device comprising:

a display layer comprising:

a lower substrate, a pixel-circuit layer comprising a pixel circuit disposed on the lower substrate, and a light emitting element electrically connected to the pixel circuit;

a quantum-dot layer disposed on the display layer and comprising a color conversion layer and a scattering layer; and an upper layer disposed on the quantum-dot layer, the upper layer comprising:

an optical layer, a color filter layer on the optical layer and partially overlapping the optical layer in a direction orthogonal to a thickness direction of the display device, a phase retardation layer on the color filter layer, a wire grid polarization layer on the phase retardation layer, and an upper substrate directly on the wire grid polarization layer, wherein the color filter layer comprises a color filter overlapping with the light emitting element in the thickness direction, and wherein the color filter and the optical layer are in direct contact with each other.

17. The electronic device of claim 16, wherein the phase retardation layer includes a N/4 phase retardation film.

18. A display device comprising:

a display layer that emits light;

a wire grid polarization layer disposed on the display layer and comprising wire grid pattern layers; and an upper substrate disposed on the wire grid polarization layer and forming a grid base on which the wire grid pattern layers are disposed, wherein the wire grid pattern layers each comprise:

a first layer directly on the grid base, a second layer on the first layer, and a third layer on the second layer, the first layer and the second layer include different metal materials from each other, the first layer absorbs at least a portion of light incident to the first layer, the second layer reflects at least a portion of light incident to the second layer, and the third layer is an oxidation prevention layer.

19. The display device of claim 18, wherein the first layer includes molybdenum tantalum oxide ($MoTaO_x$), and the second layer includes aluminum (Al).

20. The display device of claim 18, wherein a thickness of the first layer is in a range of about 350 nm to about 550 nm.

* * * * *